US010033203B1

(12) United States Patent
Snyder, Jr.

(10) Patent No.: US 10,033,203 B1
(45) Date of Patent: Jul. 24, 2018

(54) APPARATUS AND METHOD FOR CHARGING AT LEAST ONE PORTABLE ELECTRICAL DEVICE

(71) Applicant: James Frederick Snyder, Jr., West Palm Beach, FL (US)

(72) Inventor: James Frederick Snyder, Jr., West Palm Beach, FL (US)

( * ) Notice: Subject to any disclaimer, the term of this patent is extended or adjusted under 35 U.S.C. 154(b) by 61 days.

(21) Appl. No.: 15/426,389

(22) Filed: Feb. 7, 2017

Related U.S. Application Data

(60) Provisional application No. 62/293,367, filed on Feb. 10, 2016.

(51) Int. Cl.

| | |
|---|---|
| ***H01R 4/24*** | (2018.01) |
| ***H02J 7/00*** | (2006.01) |
| ***H01R 4/2404*** | (2018.01) |
| ***H01R 24/62*** | (2011.01) |
| ***H02J 7/02*** | (2016.01) |

(52) U.S. Cl.
CPC .......... *H02J 7/0027* (2013.01); *H01R 4/2404* (2013.01); *H01R 24/62* (2013.01); *H02J 7/0042* (2013.01); *H02J 7/025* (2013.01)

(58) Field of Classification Search
None
See application file for complete search history.

(56) References Cited

U.S. PATENT DOCUMENTS

| | | | | | |
|---|---|---|---|---|---|
| 3,585,571 | A * | 6/1971 | Davis | H01R 4/2483 | 439/416 |
| 3,935,637 | A | 2/1976 | Bunnell | | |
| 4,415,215 | A * | 11/1983 | Goozner | H01R 4/2404 | 439/402 |
| 5,007,855 | A * | 4/1991 | O'Brien | H01R 4/2408 | 439/411 |
| 5,353,209 | A * | 10/1994 | Foottit | F21V 19/0085 | 362/147 |
| 7,651,368 | B2 | 1/2010 | Kendall | | |
| 7,736,179 | B2 | 6/2010 | Cook | | |
| 7,940,026 | B2 | 5/2011 | Fadell | | |
| 8,789,965 | B2 * | 7/2014 | Rapisarda | A43B 3/001 | 362/103 |
| 9,112,957 | B2 | 9/2015 | Beart | | |
| 9,979,116 | B2 * | 5/2018 | Hinsch | H01R 13/514 | |
| 2004/0204177 | A1 | 10/2004 | Pon | | |
| 2009/0258533 | A1 * | 10/2009 | Dennes | H01R 4/2433 | 439/395 |

* cited by examiner

*Primary Examiner* — Charlie Y Peng

(57) ABSTRACT

An apparatus for charging at least one portable electrical mobile device includes an outer housing body using a pair of cord-penetrating electrical contacts in an elongated channel defining an elongated open passageway between opposite ends of the outer housing body to electrically couple with and draws electrical current from an electrical power-supply cord of a hosting electrical device and transfer the electrical current to an electrical port on the outer housing body in order to connect at least one portable electronic device to the electrical port to operate or recharge internal rechargeable batteries of the device. The charging apparatus provides adaptability to connect to electrical current without needing an available electrical socket.

20 Claims, 12 Drawing Sheets

APPARATUS AND METHOD FOR CHARGING AT LEAST ONE PORTABLE ELECTRICAL DEVICE

CROSS REFERENCE(S) TO RELATED APPLICATION(S)

This non-provisional U.S. patent application claims the benefit of U.S. provisional patent application No. 62/293,367, filed Feb. 10, 2016, which is hereby incorporated-by-reference herein its entirety.

FIELD OF THE INVENTION

The present invention relates to mobile device accessories, and, more particularly, is concerned with an apparatus and method for charging at least one portable electrical device.

BACKGROUND OF THE INVENTION

The beginning of the $21^{st}$ century has seen the global proliferation of portable electronic devices. These devices, such as cellular telephones, tablets, and cameras, which were once a novelty or luxury to most people, are now an integral and necessary part of the daily lives of many. Most of these devices rely on rechargeable electrochemical cells, typically referred to as batteries, for power. The most common means of charging the batteries is with the use of a USB wall mounted charger. The charger itself usually consists of a plug box containing a step-down transformer and an AC-DC converter or rectifier that is wired to a connecting plug. When in use, the plug box is plugged into a 120 V or 240 V mains socket and the connecting plug is coupled to the device. Though other means of charging batteries such as through a computer or portable battery pack are available the wall mounted charger is the most commonly used.

The necessity to plug the charger into the wall has many disadvantages. First, the electrical wall socket is seldom conveniently located. When laying out the locations for electrical sockets in a home it is common to put them low to the ground and in a location that can easily be hidden by furnishings. For example, it is common for a home to have a sofa with table lamps on one or both sides. These lamps are then plugged into a socket that is located and hidden behind the sofa. For purposes of plugging in an electrical charger this location is likely not convenient. Secondly, it may be difficult to gain access to an electrical outlet because of the limitation in the number installed or not in use by other devices. Thirdly, another disadvantage of plugging a charger into a wall-mounted electrical outlet is the limited range of the standard cord of the charger. If a person wishes to use a device while it is plugged in by the standard charger cord they will likely find themselves tethered to a wall by a 3 to 4 foot cord. A final disadvantage of a standard wall-mounted charger is that it is considered by many users to be unsightly and thus deserving of its nickname, the "Wall Wart".

In recent years some manufacturers of electronics have sought to alleviate these problems by incorporating charging ports into common house hold items such as lamps and alarm clocks. Though this approach does provide a more convenient option for charging one's portable electrical devices, it still requires the purchase of such a device, which may be expensive. The inherent flaw of this approach is that a consumer may not be able to afford or may simply not be inclined to purchase such a device with a built-in charging port.

Accordingly, there remains a need in the art for an innovation that will overcome the drawbacks of prior art approaches and the problems that remain unsolved.

SUMMARY OF THE INVENTION

The present invention is directed to an innovation that overcomes the drawbacks of the prior art and the problems that remain unsolved by providing an apparatus and method for charging at least one portable electrical device that gives consumers an alternate option that is not bound by the limitations of a wall-mounted USB charger. Instead, the charging apparatus and method allows electrical coupling of at least one portable electrical device onto, and drawing electrical current from, an electrical power-supply cord of a hosting device, such as a lamp. The charging apparatus and method thus provides adaptability to connect to an electrical current without needing an electrical socket.

In one aspect of the present invention, an apparatus for charging at least one portable electrical device includes:

- an outer housing body including a plurality of walls defining an inner compartment;
- an elongated channel on the outer housing body having a pair of opposite ends open exteriorly of the outer housing body, the elongated channel including
  - a pair of side portions spaced apart from one another, and
  - an intermediate portion extending between and interconnecting the pair of side portions and recessed from exteriorly of the outer housing body so as to extend between the opposite open ends of the elongated channel, the pair of side portions and the intermediate portion defining an elongated open passageway extending between the opposite open ends of the elongated channel for receiving through the elongated open passageway a pair of electrical conductors of a length of an electrical power-supply cord of a hosting electrical device;
- a pair of electrical contacts mounted to the intermediate portion of the elongated channel and having end portions extending into the elongated open passageway of the elongated channel configured to penetrate and electrically couple onto the pair of electrical conductors of the electrical power-supply cord when received through the elongated open passageway of the elongated channel so as to draw electrical current from the pair of electrical conductors of the electrical power-supply cord;
- a cap member configured to insert into the elongated open passageway of the elongated channel so as to force penetration of the pair of electrical conductors of the electrical power-supply cord by the end portions of the pair of electrical contacts mounted to the intermediate portion of the elongated channel;
- an electrical port defined in a portion of the outer housing body, the electrical port being open exteriorly of the outer housing body and configured to receive and electrically mate with an electrical cord electrically connected to at least one portable electrical device; and
- a circuit board disposed in the inner compartment of the outer housing body and electrically coupled to the pair of electrical contacts and to the electrical port to transfer the drawn electrical current to the at least one portable electrical device.

In another aspect of the present invention, the cap member includes:

an elongated slidable body that inserts into a portion of the elongated open passageway spaced from the intermediate portion of the elongated channel; and a pair of ribs attached to and extending in opposite directions from opposite lateral sides of the elongated slidable body so as to slide along a pair of elongated slots in the opposite side portions of the elongated channel extending away from one another such that slidable insertion of the elongated slidable body into the elongated open passageway of the elongated channel forces penetration of the pair of electrical conductors of the electrical power-supply cord by the end portions of the pair of electrical contacts mounted to the intermediate portion of the elongated channel.

In another aspect of the present invention, the elongated channel is defined centrally along and recessed into the outer housing body. Further the cap member includes a main panel, a pair of relatively-slidable and releasably-interfitting flange connections defined along a pair of opposite sides of the main panel and opposite portions of the outer housing body, and an elongated protruding panel portion defined centrally along and on the main panel such that interfitting the main panel onto the outer housing body, to complete the interfitting flange connections between the main panel and the outer housing body, inserts the elongated protruding panel portion into the elongated open passageway of the elongated channel forcing penetration of the pair of electrical conductors of the electrical power-supply cord by the end portions of the pair of electrical contacts mounted to the intermediate portion of the elongated channel.

In another aspect of the present invention, the elongated channel is defined centrally along and recessed into the outer housing body. Further, the cap member includes a main panel, a pair of relatively-movable and detachably-interfitting latch connections defined centrally along a pair of opposite sides of the main panel and opposite portions of the outer housing body, and an elongated protruding panel portion defined centrally along and on the main panel such that interfitting the main panel onto the outer housing body, to complete the interfitting latch connections between the main panel and the outer housing body, inserts the elongated protruding panel portion into the elongated open passageway of the elongated channel forcing penetration of the pair of electrical conductors of the electrical power-supply cord by the end portions of the pair of electrical contacts mounted to the intermediate portion of the elongated channel.

In another aspect of the present invention, the elongated channel is defined along and recessed into the outer housing body. Further, the cap member includes a main panel pivotally mounted along a first of a pair of opposite edge portions thereof to the outer housing body, a pair of detachable screw connections defined on a second of the pair of opposite edge portions of the main panel and on the outer housing body, and an elongated protruding panel portion defined adjacent to the second of the pair of opposite edge portions of the main panel such that attaching the main panel onto the outer housing body, to complete the screw connections between the main panel and the outer housing body, inserts the elongated protruding panel portion into the elongated open passageway of the elongated channel forcing penetration of the pair of electrical conductors of the electrical power-supply cord by the end portions of the pair of electrical contacts mounted to the intermediate portion of the elongated channel.

In another aspect of the present invention, the elongated channel is defined along and recessed into the outer housing body. Further, the cap member includes a main panel, pairs of detachable screw connections defined on a pair of opposite edge portions of the main panel and on the outer housing body, and an elongated protruding panel portion defined adjacent to one of the pair of opposite edge portions of the main panel such that attaching the main panel onto the outer housing body, to complete the screw connections between the main panel and the outer housing body, inserts the elongated protruding panel portion into the elongated open passageway of the elongated channel forcing penetration of the pair of electrical conductors of the electrical power-supply cord by the end portions of the pair of electrical contacts mounted to the intermediate portion of the elongated channel.

In another aspect of the present invention, the electrical port may be a plurality of USB ports defined in and open exteriorly of a portion of the outer housing body and configured to receive and electrically couple with a plurality of USB cords electrically connected to a corresponding plurality of portable electrical devices.

In another aspect of the present invention, the electrical port is defined in and open exteriorly of a portion of the outer housing body and configured to receive and electrically couple with and transfer drawn electrical current through an inductive charging pad coupled with the at least one portable electrical device.

In another aspect of the present invention, the charging apparatus also includes a support cradle formed on the outer housing body for holding in place a mobile electrical device.

In another aspect of the present invention, an apparatus for charging at least one portable electrical device includes:

an outer housing body including a pair of opposite end walls, a pair of opposite side walls, a top wall, and a bottom wall opposite the top wall, the walls interconnected so as to enclose an inner compartment, and an elongated channel having a pair of opposite ends open exteriorly of the housing body at the opposite end walls thereof, the elongated channel including a pair of side portions spaced apart from one another and extending from one of the top and bottom walls of the outer housing body and opening exteriorly of the outer housing body and also extending between and from adjacent to and opening exteriorly at the pair of opposite end walls of the housing body, and an intermediate portion extending between and interconnecting the pair of side portions and spaced and recessed from the opening of the side portions exteriorly of the outer housing body and at the opposite open ends of the elongated channel, the pair of side portions and the intermediate portion defining an elongated open passageway extending between the opposite open ends of the elongated channel for receiving through the elongated open passageway a pair of electrical conductors of a length of an electrical power-supply cord of a hosting electrical device;

a pair of electrical contacts mounted to the intermediate portion of the elongated channel and having end portions extending into the elongated open passageway of the elongated channel configured to penetrate and electrically couple with the pair of electrical conductors of the electrical power-supply cord when received through the elongated open passageway of the elongated channel so as to draw electrical current from the pair of electrical conductors of the electrical power-supply cord;

a cap member configured to insert into the elongated open passageway of the elongated channel so as to force penetration of the pair of electrical conductors of the electrical power-supply cord by the end portions of the pair of electrical contacts mounted to the intermediate portion of the elongated channel;

a universal serial bus (USB) port defined in one wall of opposite end walls and opposite side walls of the outer housing body, the USB port being open exteriorly of the outer housing body and configured to receive and electrically mate with a USB cord electrically connected to at least one portable electrical device; and a circuit board disposed in the inner compartment of the outer housing body and electrically coupled to the pair of electrical contacts and to the USB port to transfer the drawn electrical current to the at least one portable electrical device.

In another aspect of the present invention, a method for charging at least one portable electrical device includes:

(a) obtaining a charging apparatus having an elongated channel with a passageway on an outer housing body of the charging apparatus being open exteriorly on the outer housing body, a pair of conductor-penetrating electrical contacts in the passageway, an electrical port on the outer housing body being open exteriorly on the outer housing body, and a circuit board interconnecting the electrical contacts and the electrical port;

(b) placing a pair of electrical conductors of a length of an electrical power-supply cord of a hosting electrical device within the open passageway of the elongated channel; and (c) applying a cap member upon the electrical conductors of the electrical power-supply cord so as to force penetration of the electrical conductors by the electrical contacts so as to thereby electrically couple the electrical contacts to the electrical conductors such that electrical current is drawn from the electrical power-supply cord to the electrical port and therefrom to a portable electrical device plugged into the electrical port of the charging apparatus.

In another aspect of the present invention, the charging method also includes: (d) securing the cap member to the outer housing body of the charging apparatus.

For a better understanding of the present invention and to show how it may be carried into effect, reference will now be made to the accompanying drawings. With specific reference to the drawings, it is stressed that the particulars shown are by way of example only and for purposes of illustrative discussion of the embodiments of the present invention only, and are presented to provide what is believed to be a useful and readily understood description of the principles and conceptual aspects of the present invention. These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
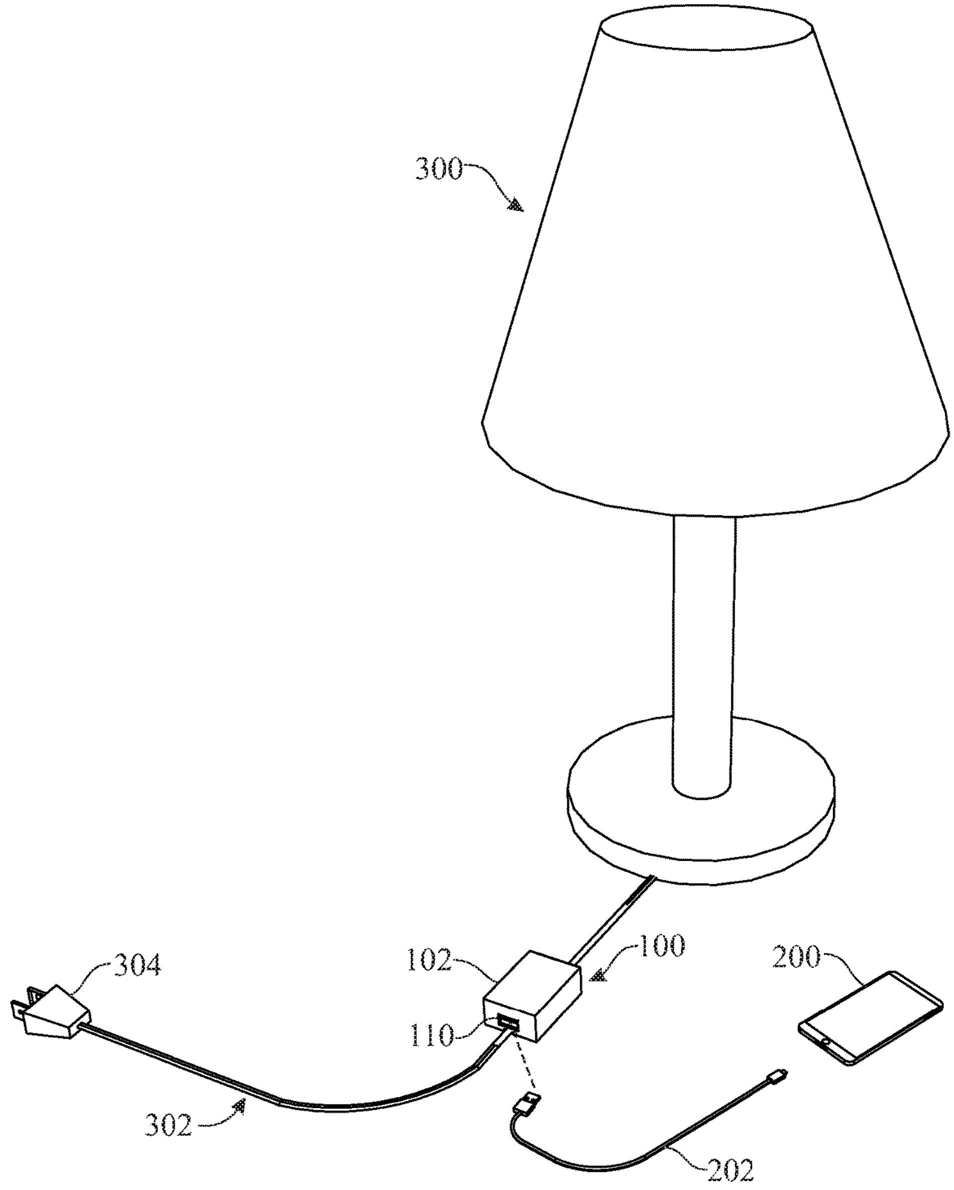
FIG. 1 presents a top isometric view of an exemplary embodiment of an apparatus for charging a portable electrical device in accordance with aspects of the present invention, the charging apparatus shown installed on an electrical power-supply cord of a hosting device.
Figure 2A:
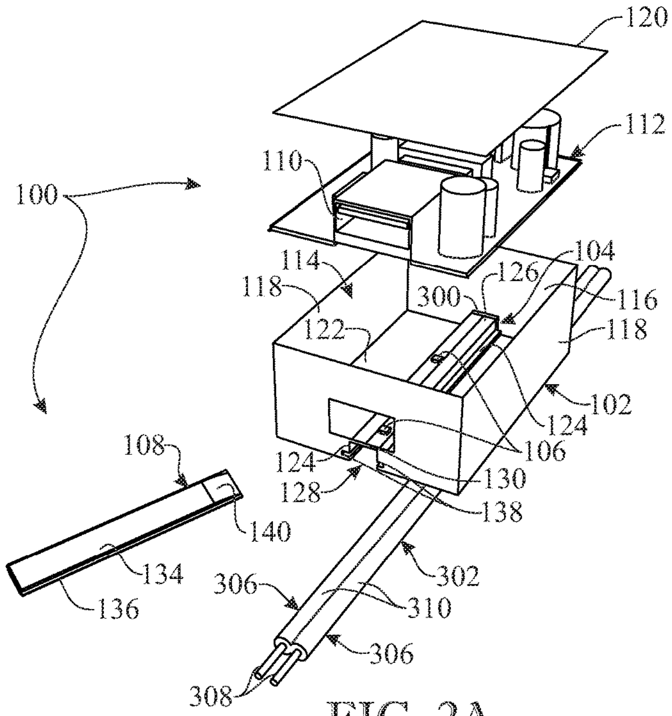
FIG. 2A presents a top exploded isometric schematic view of the charging apparatus originally introduced in FIG. 1 showing the power-supply cord and a cap member used to secure the charging apparatus to the electrical power-supply cord.
Figure 2B:
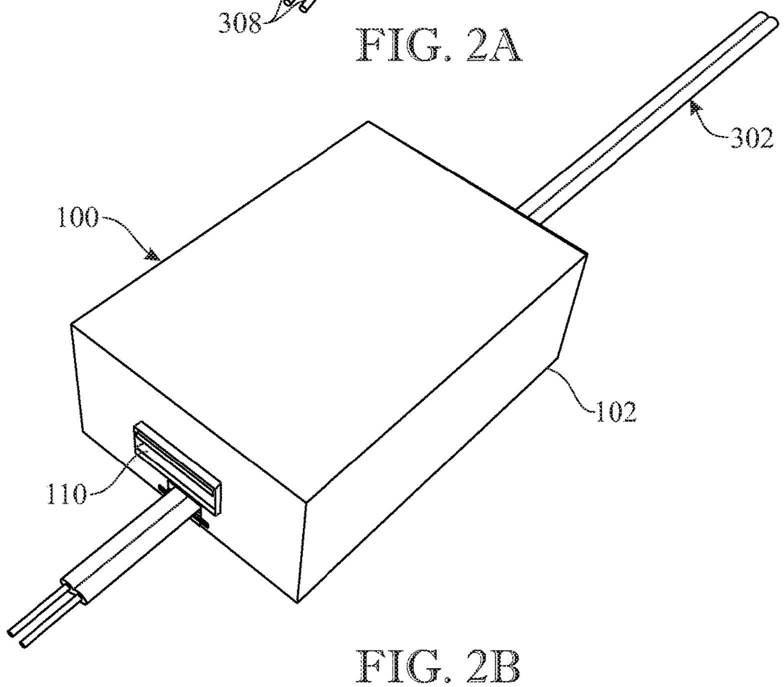
FIG. 2B presents an enlarged top assembled isometric schematic view of the charging apparatus originally introduced in FIG. 1.

Referring now to FIG. 1, there is illustrated an exemplary embodiment of an apparatus, generally designated 100, for charging at least one portable, or mobile, electrical device, generally designated 200. It should be understood that the term "charging" is being used in a genetic sense to also include the function of "powering" the at least one portable electrical device 200. The charging apparatus 100 is electrically coupled with an electrical power-supply cord 302 of a hosting electrical device 300. In order for the changing apparatus 100 to function a male socket plug 304 attached to the electrical power-supply cord 302 must be inserted into a standard wall socket (not shown) to provide electricity to the hosting electrical device 300. Once electricity is provided to the hosting electrical device 300 the charging apparatus 100 is, in turn, also provided with an electrical current that is leached, or drawn, from the electrical power-supply cord 302. The portable electrical device 200 is electrically coupled to the charging apparatus 100 by means of an electrical cord 202, such as universal serial bus (USB) charging cord. The portable electrical device 200 and the hosting electrical device 300 are respectively shown as a cellular telephone and a lamp in FIG. 1 that constitute representations of some of the possible devices that can be used in conjunction with the charging apparatus 100 but should in no way be construed as being limited to these devices. The portable electrical device 200 may be any one of a variety of portable electrical devices that rely on batteries as a power source. The electrical power-supply cord 302, as shown in FIGS. 1, 2A and 2B, may be of one of many types of cord, the most common being one having two separate electrical conductors 306 formed by wires 308 that are each wrapped individually in an insulating sleeve 310. The two insulating sleeves 310 are then bonded together so that each conductor wire 308 runs parallel to the other. These conductor wires 308 are typically between 16 and 22 gauge in width. This is the typical conductor wire that has been most commonly used by potential hosting electrical devices 300 in households since the mid $20^{th}$ century.

In FIGS. 2A-2D there is shown in more detail the exemplary embodiment of the charging apparatus 100 seen in FIG. 1. In accordance with aspects of the present invention, the charging apparatus 100 basically includes an outer housing body 102, an elongated channel 104 on the outer housing body, a pair of electrical conductor-penetrating electrical contacts 106 mounted to the elongated channel, a cap member 108 configured to insert into the elongated channel 104, an electrical port 110 on the outer housing body 102, and a circuit board 112 electrically interconnecting the pair of electrical conductor-penetrating electrical contacts 104 and the electrical port 110. The outer housing body 102 may be made from a suitable material that is rigid enough to provide structural support. Molded plastic is an example of one practical suitable material from which it can be made, but other materials may be used. Power in the form of electrical current is provided to the charging apparatus 100 by means of the electrical conductor-penetrating electrical contacts 106.

More particularly, the outer housing body 102 of the charging apparatus 100 is formed by a plurality of rigidly interconnected walls that form and enclose an inner compartment 114. The plurality of walls include a pair of opposite end walls 116, a pair of opposite side walls 118, a top wall 120 and a bottom wall 122 opposite from the top wall. The outer housing body 102 illustrated in the drawings has a rectangular configuration; however it may have other alternative configurations. The elongated channel 104 of the charging apparatus 100 on the outer housing body 102 may extend into the inner compartment 114 thereof and is formed by a pair of side portions 124 and an intermediate portion 126. The pair of side portions 124 are spaced apart from one another by the intermediate portion 126, which extends between and interconnects the side portions. The intermediate portion 126, which in this exemplary embodiment forms a ceiling of the elongated channel 104, is spaced above the bottom wall 122, extends between the opposite end walls 116, and is recessed from the exterior, of the outer housing body 102 such that the elongated channel 104 defines an elongated open passageway 128 extending between a pair of opposite ends 130 of the elongated channel being open exteriorly of the outer housing body 102 at the pair of opposite end walls 116 thereof. The elongated open passageway 128 of the elongated channel 104 receives the pair of electrical conductors 306 of a selected length of the electrical power-supply cord 302 of the hosting electrical device 300.

Figure 2C:
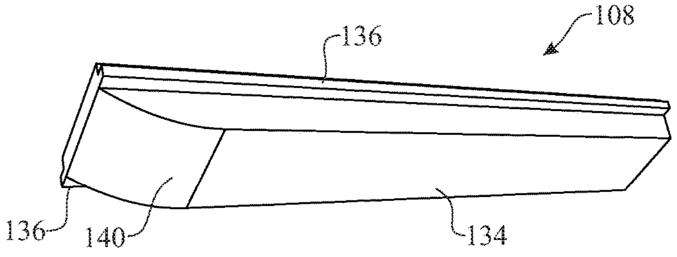
FIG. 2C presents an enlarged inverted isometric schematic view of the cap member shown in FIG. 2A.
Figure 2D:
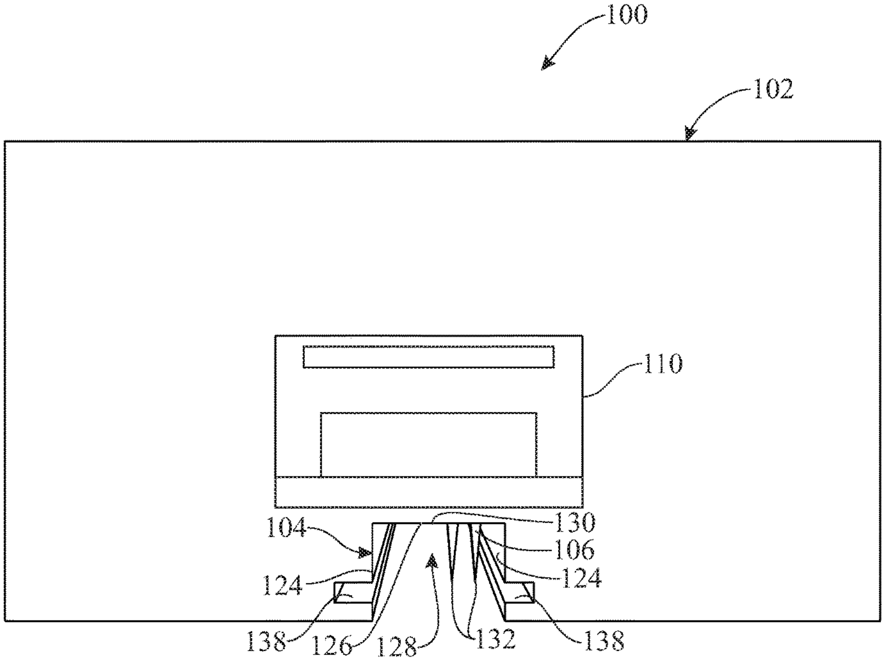
FIG. 2D presents an enlarged front schematic view of the charging apparatus originally introduced in FIG. 1 showing an elongated groove in the bottom of an outer housing body of the charging apparatus and conductor-penetrating electrical contacts in the elongated groove.

The pair of electrical conductor-penetrating electrical contacts 106 of the charging apparatus 100 is shown in greater detail in FIGS. 2A and 2D. The electrical contacts 106 are mounted to the intermediate portion 126 of the elongated channel 104 and have electrical conductor-penetrating end portions 132 extending into the elongated open passageway 128 of the elongated channel. The electrical contact end portions 132 are configured to penetrate and electrically couple onto the pair of electrical conductors 306 of the electrical power-supply cord 302 when the latter is received through the elongated open passageway 128 of the elongated channel 104 in order to leach or draw electrical current from the electrical power-supply cord. The electrical conductor-penetrating electrical contacts 106 may be made from a rigid, electrically conductive material such as but not limited to copper, and the contact end portions 132 may be two sharp tines or prongs for each contact, such as commonly used in roller-wheel type lamp switches. Having multiple penetrating tines increases the likelihood of making good contact with the inner conductive wires 308 of the electrical power-supply cord 302; however any number of tines or prongs per contact will suffice so long as they are made of a material that is rigid enough and sharp enough to penetrate the outer insulating sleeve 310 of the power-supply cord 302 while not severing the internal electrically conductive wire.

The cap member 108 of the charging apparatus 100 is configured to insert into the elongated open passageway 128 of the elongated channel 104 so as to force penetration of the pair of electrical conductors 306 of the electrical power-supply cord 302 by the conductor-penetrating end portions 132 of the electrical contacts 106 mounted to the intermediate portion 126 of the elongated channel. More particularly, in the exemplary embodiment of FIG. 1, and as best shown in FIGS. 2A and 2C, the cap member 108 is an elongated slidable body 134 that inserts into an outer portion of the elongated open passageway 128 adjacent to the bottom wall 122 of the outer housing body 102 and spaced from the intermediate or ceiling portion 126 of the elongated channel 104, so as to allow space for the electrical power-supply cord 302 therebetween. The elongated slidable body 134 has a pair of ribs 136 attached along and extending in opposite directions from opposite lateral sides of the elongated slidable body so as to slide along a pair of elongated slots 138 in the opposite side portions 124 of the elongated channel 104 extending from away from one another such that the slidable insertion of the cap member 108 into the elongated open passageway 128 of the elongated channel forces penetration of the electrical conductors 306 of the electrical power-supply cord 302 by the electrical conductor-penetrating electrical contacts 106 mounted to the intermediate portion 126 of the elongated channel 104. The insertion of the cap member 108 provides a means for securely attaching the outer housing body 102 of the charging apparatus 100 to and coupling it with the power-supply cord 302 of the hosting electrical device 300. The elongated channel 104 is of a depth sufficient to hold the electrical power-supply cord 302 while not interfering with the insertion of the cap member 108. Further, the electrical power-supply cord 302 when placed in the elongated channel 104 is automatically aligned by the elongated channel so that each electrical contact 106 is aligned with the electrical power-supply cord 302. The cap member 108 also has a tapered or slopped entry end 140 so that it can be readily inserted into the elongated channel 104 and slid lengthwise along the electrical power-supply cord 302 securing it in place. The tapered entry end 140 prevents the cap member 108 from snagging on the electrical power-supply cord 302 while simultaneously pressing the power-supply cord firmly against the electrical contacts 106 effectively sandwiching the electrical power-supply cord in-between the cap member 108 and the intermediate portion 126 of the elongated channel 104.

The electrical port 110 of the charging apparatus 100 is attached on a selected one of the opposite end walls 116 and side walls 118 of the outer housing body 102. The electrical port 110 opens exteriorly of the outer housing body 102 and is configured to receive and electrically mate with the electrical cord 202, such as the universal serial bus (USB) charging cord, of the portable electrical device 200. The electrical port 110 per se may be of a standard design such as a USB port as used in other electronic devices. Variations on this design can be made without altering the base function of the charging apparatus 100. In addition other forms of ports including, but not limited to micro-USB and mini-VGA ports, can be used in place of the USB port.

The circuit board 112 of the charging apparatus 100 is disposed in the inner compartment 114 of the outer housing body 102 and electrically interconnects the electrical cord-penetrating electrical contacts 106 and the electrical port 110 to transfer the leached, or drawn, electrical current to the at least one portable electrical device 200. The circuit board 112 has the necessary electrical components to transform, regulate and transfer the drawn electrical current as needed by the specific features of the charging apparatus 100 and the portable electrical device 200 to be charged. Circuit boards and such electrical components as currently used in standard wall-mounted universal serial bus (USB) chargers will be sufficient to meet these needs.

Figure 3A:
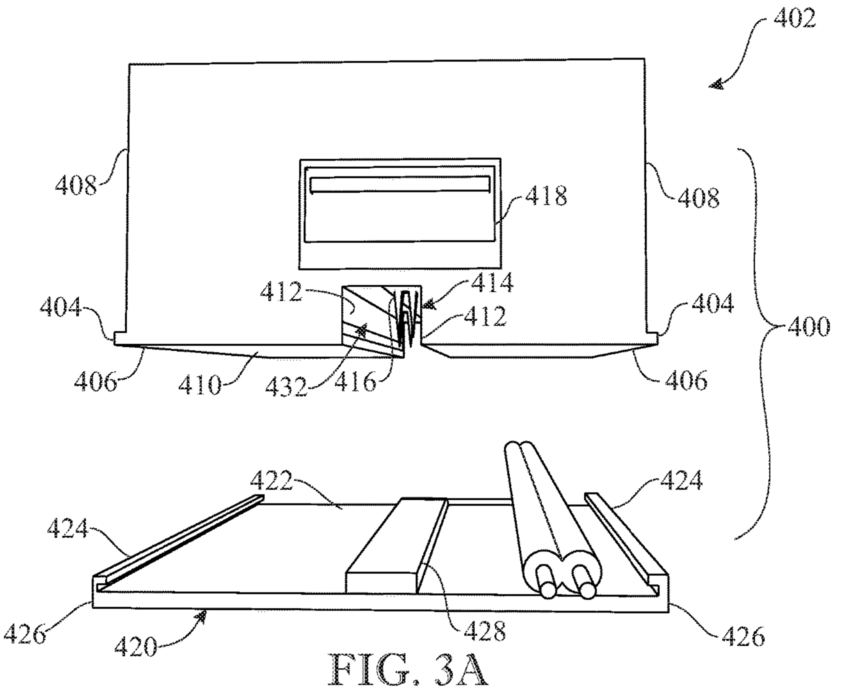
FIG. 3A presents a front exploded isometric schematic view of another exemplary embodiment of the charging apparatus in accordance with aspects of the present invention.
Figure 3B:
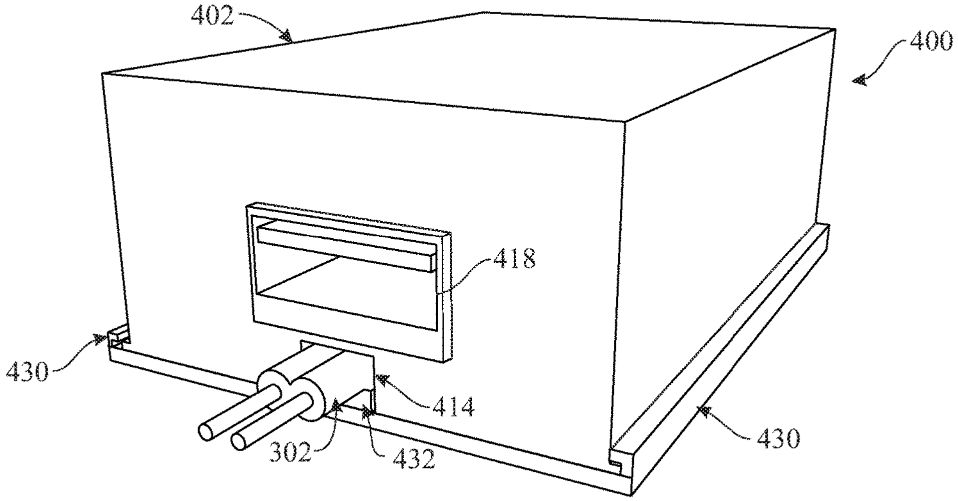
FIG. 3B presents a front assembled isometric schematic view of the charging apparatus of FIG. 3A shown installed on the electrical power-supply cord.
Figure 3C:
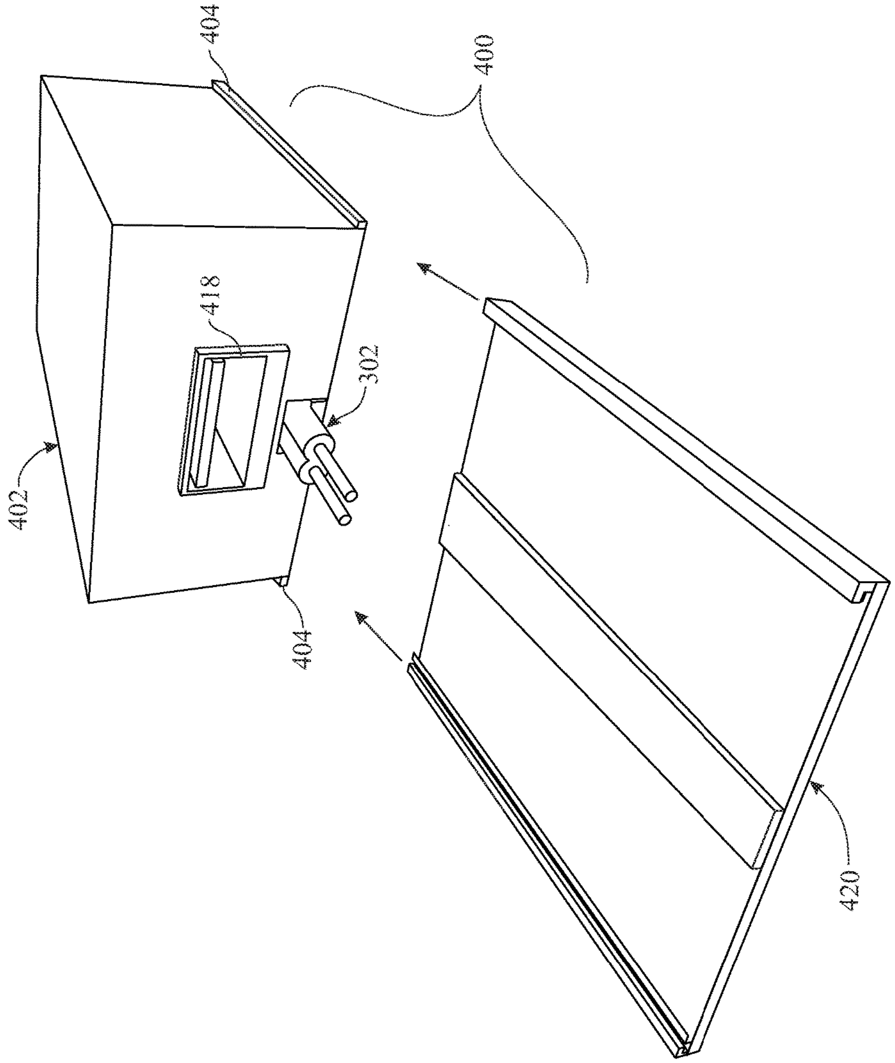
FIG. 3C presents a front exploded isometric schematic view of the charging apparatus of FIG. 3A shown in the process of being installed on the electrical power-supply cord.

Referring now to FIGS. 3A-3C, there is illustrated another exemplary embodiment of the charging apparatus, generally designated 400, in accordance with aspects of the present invention. In this exemplary embodiment the charging apparatus 400 has an outer housing body 402 and a pair of protruding flanges 404 on opposite bottom longitudinal corner edges 406 at the merger of opposite side walls 408 with the bottom wall 410. Except for the absence of elongated slots from opposite side portions 412 of an elongated channel 414, the elongated channel and also a pair of electrical contacts 416, an electrical port 418 and a circuit board (not shown), are substantially the same as in the above-described exemplary embodiment of FIGS. 2A-2D. The elongated channel 414 is defined centrally along and recessed from the bottom wall 410 of the outer housing body 402. A cap member 420, differing from that of FIGS. 2A-2D, includes a main panel 422 of generally planar configuration and a pair of upstanding protruding flanges 424 on a pair of opposite side edges 426 of the main panel that align with the protruding flanges 404 on the outer housing body 402. The main panel 422 also has an elongated upwardly protruding panel portion 428 defined centrally therealong such that by sliding the main panel 422 relative to and onto the bottom wall 410 of the outer housing body 402, to complete a pair releasable interfitting flange connections 430 between the main panel and the outer housing body, the elongated protruding panel portion 428 inserts into an elongated open passageway 432 of the elongated channel 414 forcing penetration of the pair of electrical conductors 306 of the electrical power-supply cord 302 by the pair of electrical contacts 416 mounted to the elongated channel. In completing the flange connections 430 the cap member 420 is secured to the outer housing body 402 so as to sandwich the electrical power-supply cord 302 therebetween and press the conductor-penetrating electrical contacts 416 against the electrical power-supply cord 302 causing the former to penetrate through the latter while holding it firmly in place.

Figure 4:
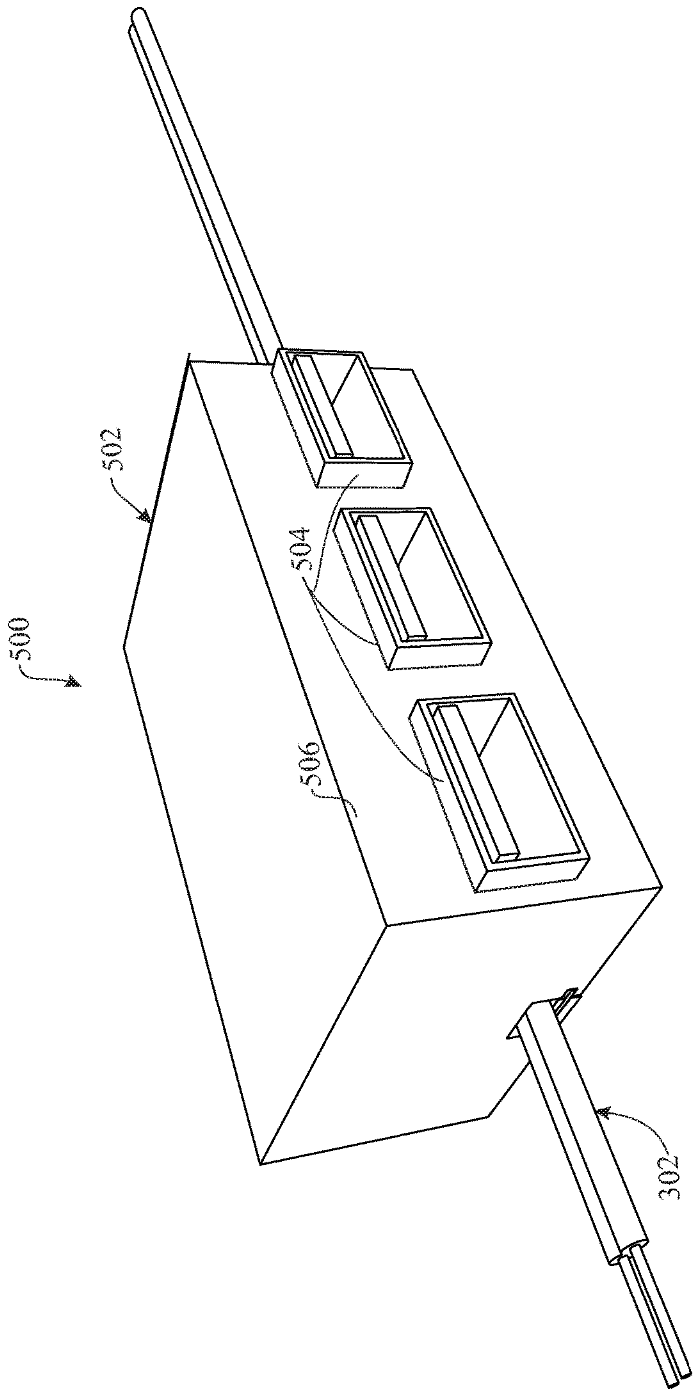
FIG. 4 presents a front isometric view of another exemplary embodiment of the charging apparatus installed on the electrical power-supply core for charging multiple portable electrical devices in accordance with aspects of the present invention.

Referring to FIG. 4, there is shown another exemplary embodiment of the charging apparatus, generally designated 500, which is substantially the same as that shown in FIGS. 2A-2D. However, an outer housing body 502 of the charging apparatus 500 has a plurality of electrical ports 504, such as in the form of a plurality of USB ports, defined in one of the side walls 506 of the outer housing body 502 so as to open exteriorly of the outer housing body. The electrical ports 504 are configured to receive and electrically couple with a plurality of USB cords electrically connected to a corresponding plurality of portable electrical devices (not shown). In addition a status indicator (not shown) may be included on the exterior of the outer housing body 502 as a means of showing the charging status of one or more portable electrical devices (not shown) being charged. The status indicator may be a LED light; however, other forms of indicators can be substituted.

Figure 5A:
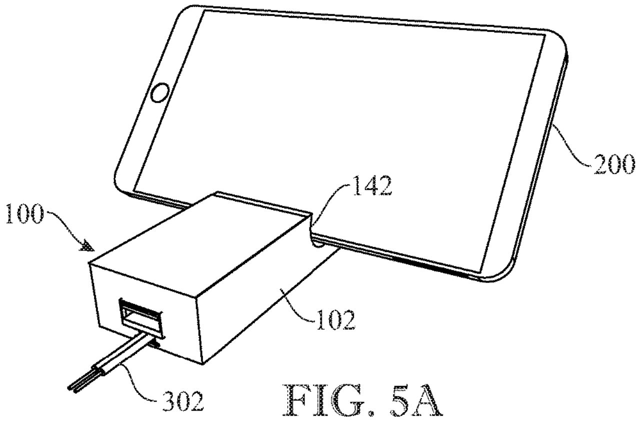
FIG. 5A presents a front isometric view of an exemplary embodiment of the charging apparatus similar to that of FIGS. 2A-2D showing the addition of a support cradle incorporated for holding in place a portable electrical device.
Figure 5B:
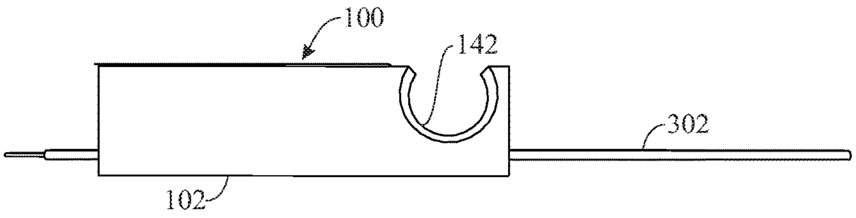
FIG. 5B presents a side elevation view of the charging apparatus of FIG. 5A.
Figure 5C:
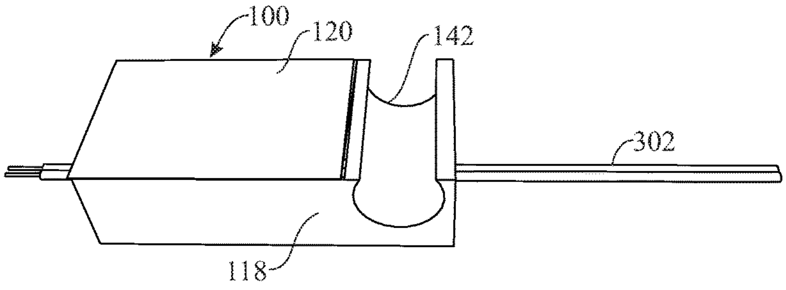
FIG. 5C presents a side isometric view of the charging apparatus of FIG. 5B.

Referring now to FIGS. 5A-5C, there is illustrated an exemplary embodiment of the charging device, generally designated 100, which is much like that of FIGS. 2A-2D. However, the outer housing body 102 has the addition of a support cradle 142 formed therein. The support cradle 142 as shown in FIG. 5B may be in the form of a three-quarters circular cutout set into the top wall 120 and between the opposite side walls 118 at one end portion of the outer housing body 102. The portable electrical device 200 can be laid into the support cradle 142 so that it can held in place. However, the shape and design of the support cradle 142 as shown in FIG. 5B is only one example; other shapes and designs may be substituted.

Figure 6:
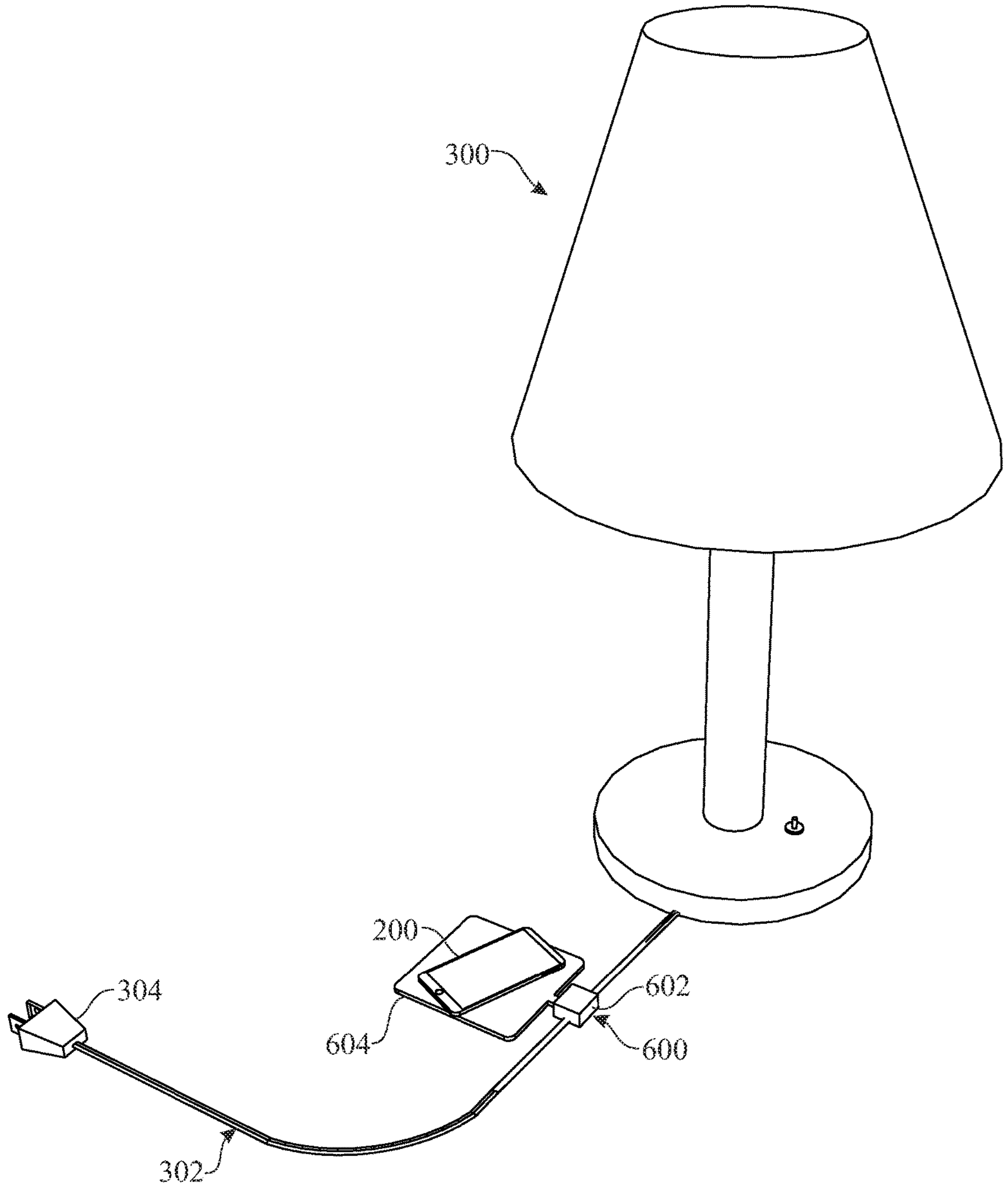
FIG. 6 presents a top isometric view of another exemplary embodiment of the charging apparatus installed on the electrical power-supply cord of a hosting device in accordance with aspects of the present invention for charging a portable electrical device by transfer of electrical current through provision of an inductive charging pad electrically coupled with the portable electrical device.

Referring to FIG. 6, there is shown another exemplary embodiment of the charging apparatus, generally designated 600, being similar to that of FIG. 4 and thus also similar to that of FIGS. 2A-2D. The charging apparatus 600 has outer housing body 602, an electrical port (not shown), such as a USB port, defined in and open exteriorly of the one side wall of the outer housing body, and an inductive charging pad 604 plugged into the electrical port. The inductive charging pad 604 is used as the means for transferring electrical current through the inductive pad to the portable electrical device 200 while the portable electrical device is in contact with the inductive pad.

Figure 7A:
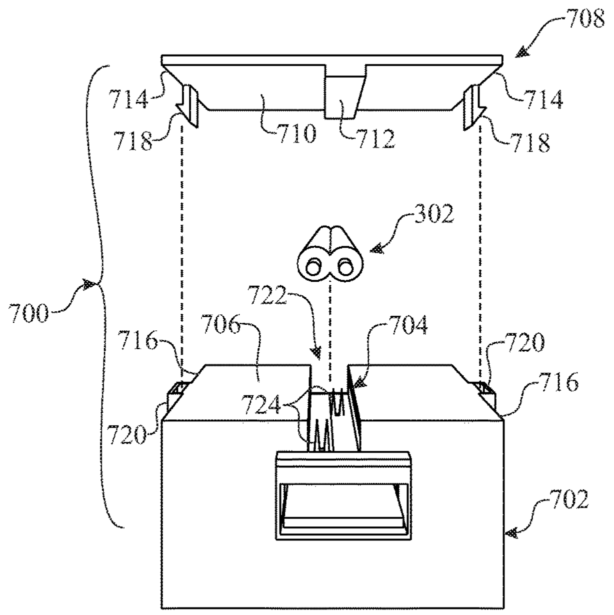
FIG. 7A presents a front exploded isometric schematic view of another exemplary embodiment of the charging apparatus for charging a portable electrical device in accordance with aspects of the present invention, the charging apparatus being shown having an outer housing body and a removable cap member with mateable locking clips.
Figure 7B:
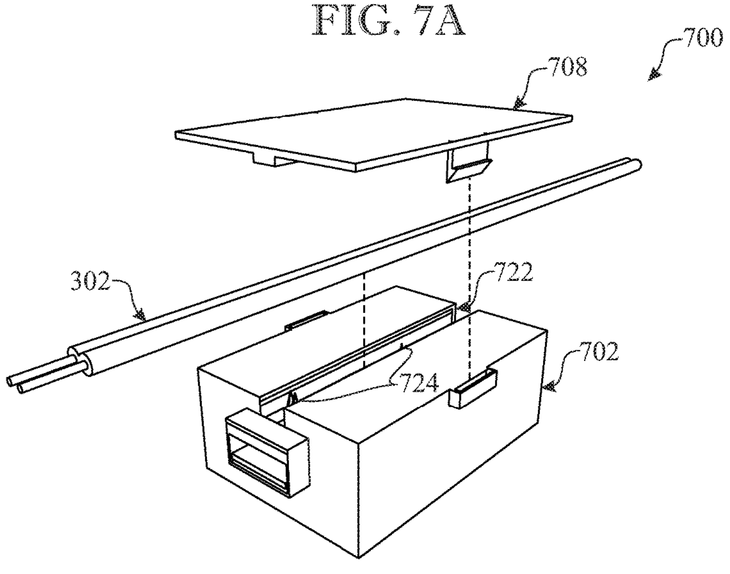
FIG. 7B presents a front exploded isometric schematic view of the charging device of FIG. 7A.

Referring now to FIGS. 7A-7B, there is illustrated another exemplary embodiment of the charging apparatus, generally designated 700, in accordance with aspects of the present invention. The charging apparatus 700 is provided with alternate means for electrically coupling with the electrical power-supply cord 302. The charging apparatus 700 has an outer housing body 702 and an elongated channel 704 defined centrally along and recessed inwardly from a top wall 706 of the outer housing body 702. The charging apparatus 700 also has a cap member 708 that includes a planar-shaped main panel 710 having an elongated downwardly protruding panel portion 712 defined centrally along and on the underside of the main panel. A pair of relatively-movable and detachably-interfitting latch connections are defined centrally along a pair of opposite sides 714 of the main panel 710 and a pair of top corners 716 of the outer housing body 702 by means of a pair of locking dips 718 attached on the opposite sides of the main panel and a pair of locking latches 720 attached on the top corners of the outer housing body. Different designs and locations of the clips 718 and latches 720 can be used with the same results. By interfitting of the main panel 710 onto the top wall 706 of the outer housing body 702, to complete the interfitting latch connections, the elongated protruding panel portion 712 inserts into an elongated open passageway 722 of the elongated channel 704 forcing penetration of the pair of electrical conductors 306 of the electrical power-supply cord 302 by a pair of electrical contacts 724 mounted to the elongated channel 704. The electrical power-supply cord 302 when installed in the elongated channel 704 is aligned so that cord is aligned or centered over conductor-penetrating electrical contacts 724. In completing the latch connections the cap member 708 is secured to the outer housing body 702 so as to sandwich the electrical power-supply cord 302 therebetween and press the conductor-penetrating electrical contacts 724 against the electrical power-supply cord 302 causing the former to penetrate through the latter while holding it firmly in place.

Figure 10:
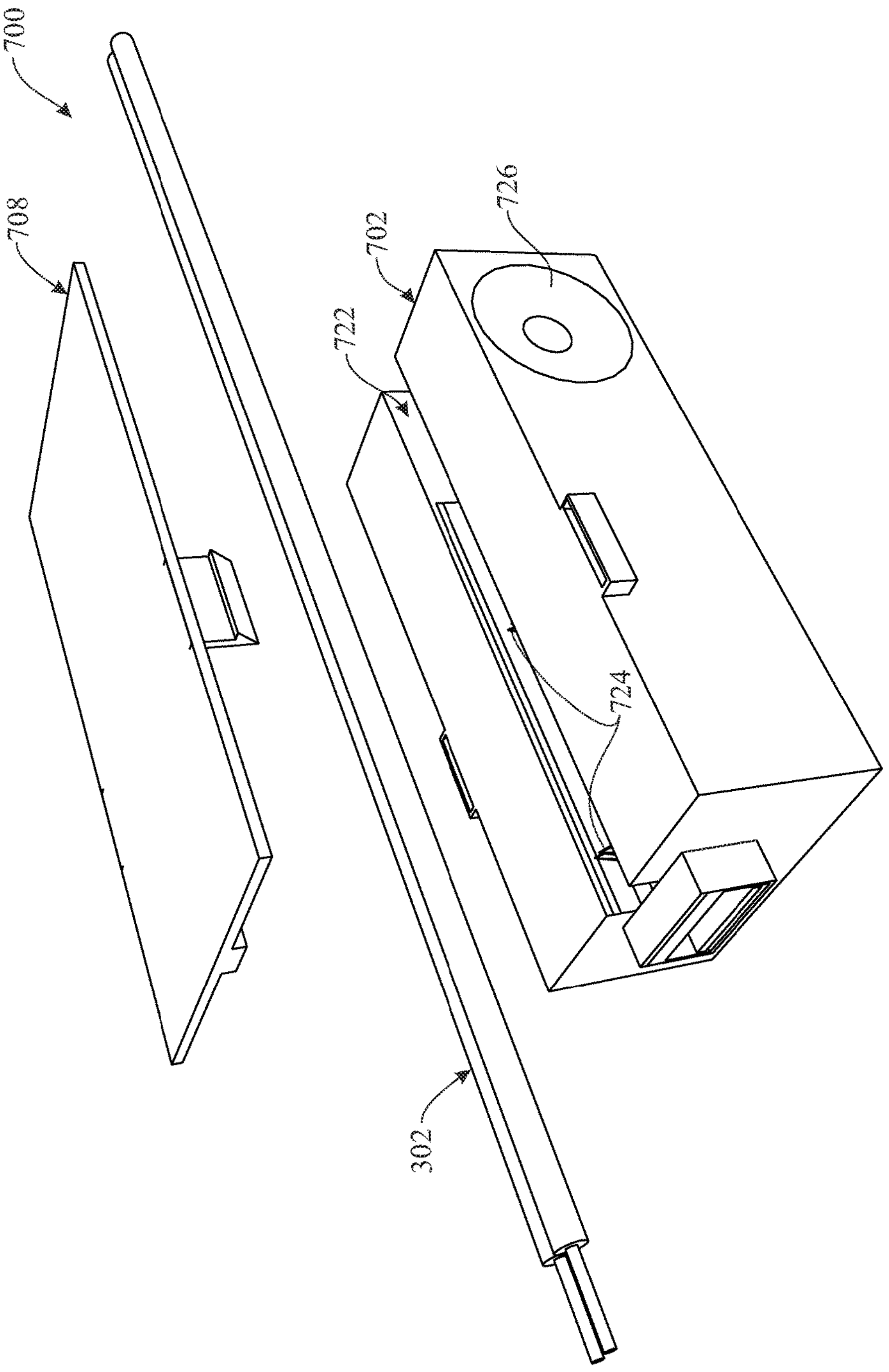
FIG. 10 presents a front exploded isometric schematic view of another exemplary embodiment of the charging device similar to that of FIGS. 7A and 7B showing a speaker incorporated for transmission of sound.

In FIG. 10, the charging apparatus 700 is substantially the same as that shown in FIGS. 7A-7B with the addition of a speaker 726 incorporated on the outer housing body 702 as a means for the transmission of sound. The signal or information can be transmitted from a portable electrical device (not shown) to the charging apparatus 700 by direct wire or wireless means.

Figure 8:
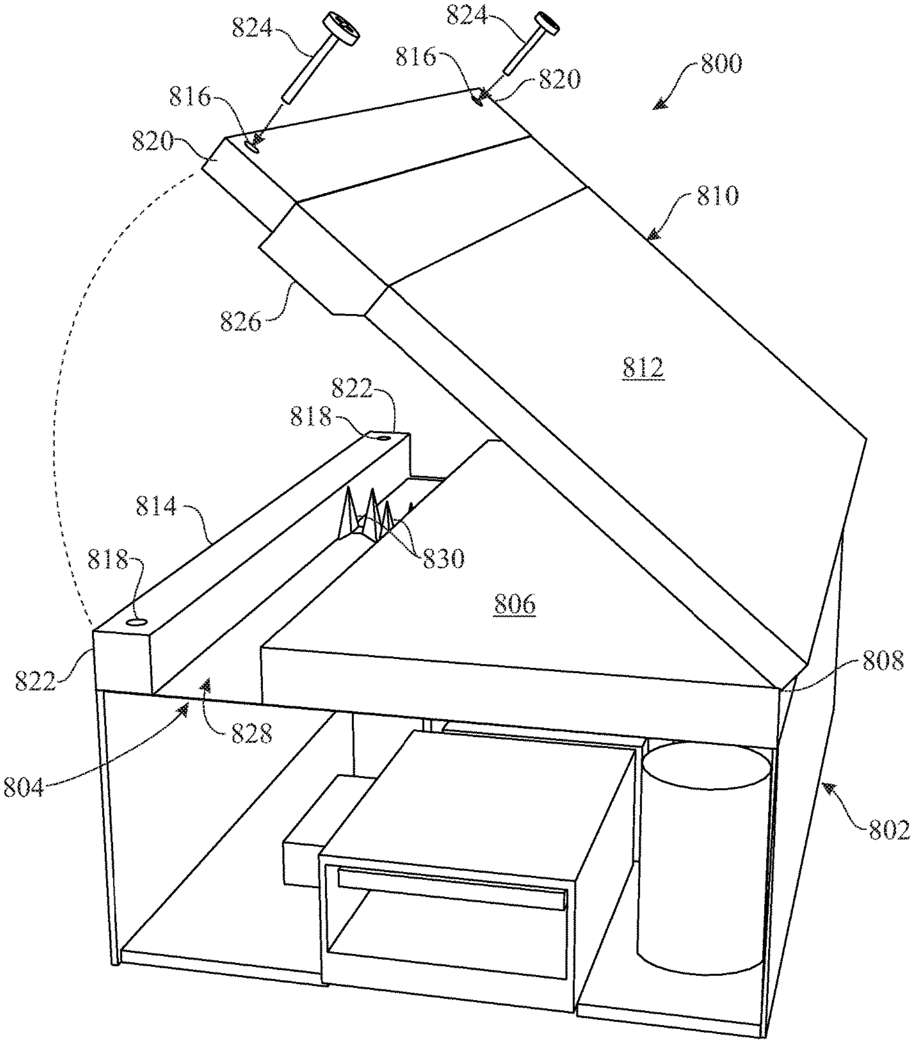
FIG. 8 presents a front isometric schematic view of another exemplary embodiment of the charging apparatus for charging a portable electrical device in accordance with aspects of the present invention, the charging apparatus being shown having an outer housing body and a pivotal cap member securable on the outer housing body by use of screws.

Referring to FIG. 8, there is shown another exemplary embodiment of the charging apparatus, generally designated 800, in accordance with aspects of the present invention. The charging apparatus 800 has an outer housing body 802 and an elongated channel 804 defined along and recessed into a top wall 806 of the outer housing body adjacent to a first 808 of a pair of opposite top corner edges thereof. The charging apparatus 800 also has a cap member 810 which includes a planar main panel 812 pivotally hinged or mounted along a second 814 of the pair of opposite corner edges of the outer housing body 802. The outer housing body 802 and the cap member 810 also has a pair of detachable screw connections made up of pairs of apertures 816 and bores 818 respectively defined adjacent pairs of corners 820, 822 on the second corner edge 814 of the top wall 806 of the outer housing body and on the main panel 812. The screw connections include pairs of unthreaded apertures 816 and threaded bores 818 through the respective pairs of corners 820, 822 of the main panel 812 and the top wall 806 of the outer housing body 802, and a pair of screws 824 that insert through the aligned unthreaded apertures 816 and threaded bores 818 to tighten the main panel 812 onto the top wall 806 of the outer housing body 802. The cap member 810 also includes an elongated downwardly protruding panel portion 826 defined on the main panel 812 in alignment with the elongated channel 804 such that attaching the main panel onto the top wall 806 of the outer housing body 802, to complete the screw connections between the main panel and the outer housing body, inserts the elongated protruding panel portion 826 into the elongated open passageway 828 of the elongated channel 804 forcing penetration of the pair of electrical conductors 306 of the electrical power-supply cord 302 by the pair of electrical contacts 830 mounted to elongated channel. When placed through the elongated open passageway 828 of the elongated channel 804, the electrical conductors 306 of the electrical power-supply cord 302 are aligned and centered over the conductor-penetrating electrical contacts 830 such that elongated protruding panel portion 826 of the cap member 810 presses the electrical power-supply cord 302 against the electrical contacts 830 and the cap member is then secured to the outer housing body 802 be means of the screws 824.

Figure 9:
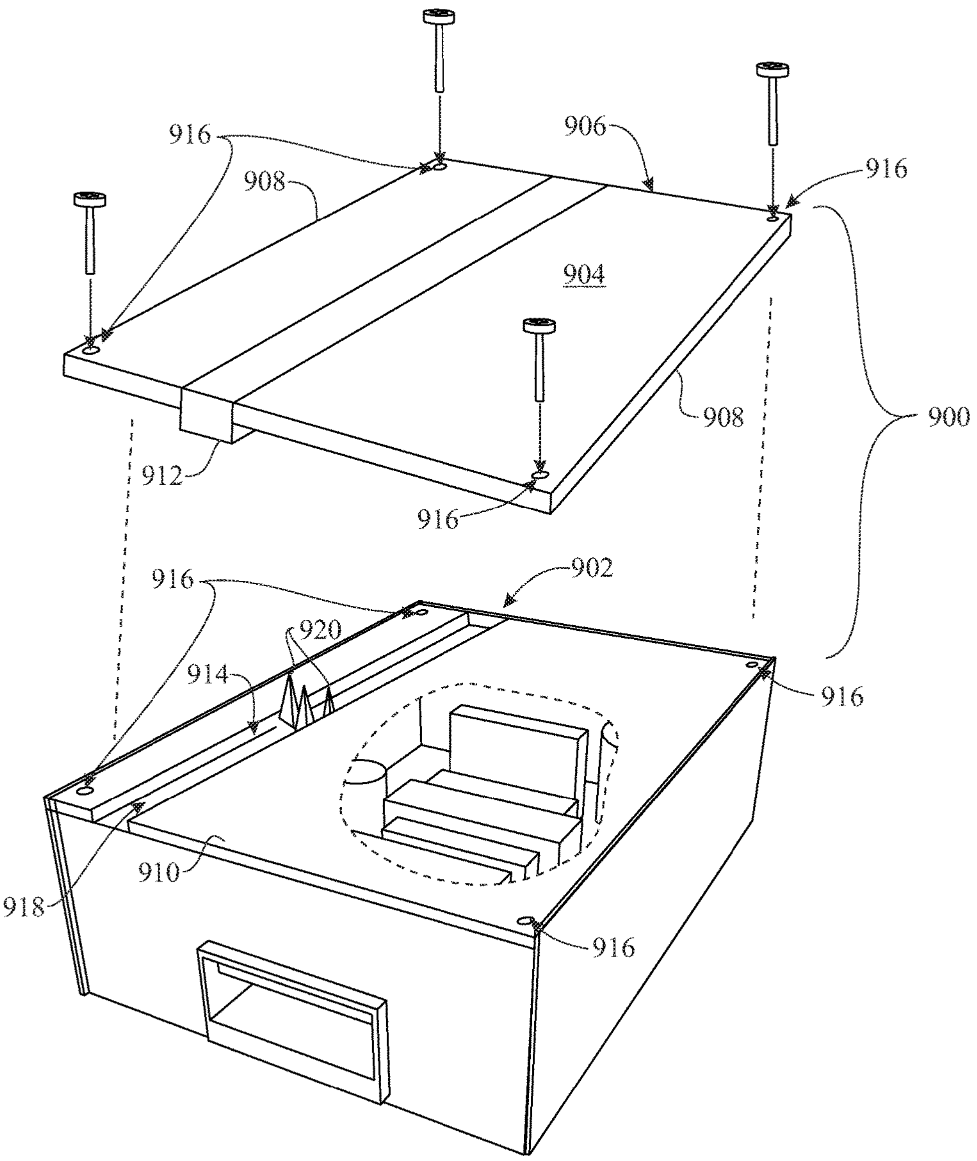
FIG. 9 presents a front isometric schematic view of another exemplary embodiment of the charging apparatus for charging a portable electrical device in accordance with aspects of the present invention, the charging apparatus being shown having an outer housing body and a removable cap member securable on the outer housing body by use of screws.

Referring now to FIG. 9, there is illustrated another exemplary embodiment of a charging apparatus, generally designated 900, in accordance with aspects of the present invention. This embodiment is substantially similar to that of FIG. 8 except that the charging apparatus 900 has an outer housing body 902 on which a main panel 904 of a cap member 906 is fastened by pairs of detachable screw connections defined at pairs of corners on each of a pair of opposite edge portions 908 of the main panel and on pairs of corners of the top wall 910 of the outer housing body 902. The elongated protruding panel portion 912 on the main panel 904 of the cap member 906 and the elongated channel 914 on the top wall 910 of the outer housing body 902 are in the same locations so that by attaching of the main panel onto the outer housing body, to complete the screw connections 916 between the main panel and the outer housing body, the elongated protruding panel portion 912 inserts into the elongated open passageway 918 of the elongated channel forcing penetration of the pair of electrical conductors 306 of the electrical power-supply cord 302 by the pair of electrical contacts 920 mounted to the elongated channel.

All of the above-described exemplary embodiments perform the same basic method of charging at least one portable electrical device, as follows: (a) obtaining a charging apparatus having an elongated channel with a passageway on an outer housing body of the charging apparatus being open exteriorly on the outer housing body, a pair of conductor-penetrating electrical contacts in the passageway, an electrical port on the outer housing body being open exteriorly on the outer housing body and a circuit board interconnecting the electrical contacts and the electrical port; (b) placing a pair of electrical conductors of a length of an electrical power-supply cord of a hosting electrical device within the passageway of the elongated channel; and (c) applying a cap member upon the electrical conductors of the electrical power-supply cord so as to force penetration of the electrical conductors by the electrical contacts so as to thereby electrically couple the electrical contacts to the electrical conductors such that electrical current is drawn from the electrical power-supply cord to the electrical port and therefrom to a portable electrical device plugged into the electrical port of the charging apparatus. The method further includes: (d) securing the cap member to the outer housing body of the charging apparatus.

Concerning the potential ramifications and scope of the present invention, the many possible embodiments of the charging apparatus can be carried into being with any number of various features. The material that the outer housing is made may vary so long as it is rigid enough to support the structure. Examples of materials that can be used are, but are not limited to, plastic, metal, wood, glass, acrylic, rubber, or a combination of multiple materials.

In addition, the wire-penetrating electrical contacts can be made from any material that is both electrically conductive and rigid enough to penetrate through the insulating sleeve of the power-supply cord. The length, shape and number to tines or prongs used in the wire-penetrating electrical contacts may also vary so long as they are capable of penetrating the insulating sleeve of the power-supply cord and making contact with the inner electrically conductive wire while not severing said wire or insulating sleeve. Further, the contacts can be of a nature to either puncture the insulating sleeve or cut into the sleeve, again so long as the inner wire and insulating sleeve are not severed.

Furthermore, the conductor-penetrating electrical contacts may be inserted into the electrical power-supply cord by manual or mechanical means. One may use a finger, tool or mechanical mechanism either separate from or incorporated into the main body to press the contacts into the conductors. The electrical power-supply cord may be divided into its two separate wires if a configuration calls for it.

Still further, the number and types of connection ports can vary. The standard port that is most commonly used for charging of mobile devices is the USB port, however other types such as, but not limited to, micro-USB or mini-VGA can be substituted where needed. Multiple types of ports can be included on the same device if needed. A single or a plurality of ports may be incorporated into the device. In addition induction can also be used as an effective means for charging without the need for a port.

Yet further, the means of securing or coupling the charging apparatus to the electrical power-supply cord can be configured in a multitude of ways. The cord may be coupled with the outer housing body of the charging apparatus or with an off body extension. The components of the outer housing body may be secured by various means including but not limited to inserts, caps, clips, clasps, adhesives, screws, or a mechanical locking mechanism.

Though the main distinctive features of the present invention that separate it from the prior art are its ability to attach to and leach or draw electrical power from a hosting electrical device, many additional features and combinations of features can be added to the charging apparatus. These features may include but are not limited to a fuse or breaker mechanism to terminate power or electrical connection in the event of an electrical short, an automatic voltage regulator, a status indicator, a support cradle, a docking port, a speaker and means from transmitting sound, a clock, a nightlight, or an air freshener.

Concerning the potential advantages of the present invention, the charging apparatus provides multiple advantages over the prior art. The first advantage is that unlike previously available charging devices, it does not rely on a standard electrical socket as a source of direct power. Secondly, its ability to couple at any point along the length of a hosting devices electrical power-supply cord allows for a greater diversity in potential locations for the unit. Further, its ability to couple with and draw power from a hosting device allows for said device to be retrofitted to incorporate a charging port. This ability is especially advantageous to the hotel industry where the cost of updating room fixtures in large numbers would likely be very high.

Additionally, multiple units can be used on a single electrical power-supply cord allowing for a greater number of devices to be charged simultaneously. Such a device would allow a user to retrofit an older electronic device to include a new modern feature. This ability is especially advantageous to the hotel industry where the cost of updating room fixtures in large numbers would likely be very high. A further benefit of disclosed invention is that a multitude of units may be applied to a single electrical power-supply cord. Such a string of charging apparatuses could be of great usefulness to emergency responders in a situation where a mobile operation center may need to be set up. In this instance a string of these units would allow for a large number of mobile devices to be either charged or powered while allowing them to be spread out so that individuals can use them and not be crowded together.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. An apparatus for charging at least one portable electrical device, said apparatus comprising:

an outer housing body defining an inner compartment;

an elongated channel on said outer housing body having a pair of opposite ends open exteriorly of said outer housing body, said elongated channel comprising a pair of side portions spaced apart from one another, and an intermediate portion extending between and interconnecting said pair of side portions and recessed from exteriorly of said outer housing body so as to extend between said opposite open ends of said elongated channel, said pair of side portions and said intermediate portion defining an elongated open passageway extending between said opposite open ends of said elongated channel for receiving through said elongated open passageway a pair of electrical conductors of a length of an electrical power-supply cord of a hosting electrical device;

a pair of electrical contacts mounted to said intermediate portion of said elongated channel and having end portions extending into said elongated open passageway of said elongated channel configured to penetrate and electrically couple onto the pair of electrical conductors of the electrical power-supply cord when received through said elongated open passageway of said elongated channel so as to draw electrical current from the pair of electrical conductors of the electrical power-supply cord;

a cap member configured to insert into said elongated open passageway of said elongated channel so as to force penetration of the pair of electrical conductors of the electrical power-supply cord by said end portions of said pair of electrical contacts mounted to said intermediate portion of said elongated channel;

an electrical port defined in a portion of said outer housing body, said electrical port being open exteriorly of said outer housing body and configured to receive and electrically mate with an electrical cord electrically connected to at least one portable electrical device; and a circuit board disposed in said inner compartment of said outer housing body and electrically coupled to said pair of electrical contacts and to said electrical port to transfer the drawn electrical current to the at least one portable electrical device.

2. The apparatus of claim 1 wherein said cap member comprises:

an elongated slidable body that inserts into a portion of said elongated open passageway spaced from said intermediate portion of said elongated channel; and a pair of ribs attached to and extending in opposite directions from opposite lateral sides of said elongated slidable body so as to slide along a pair of elongated slots in said opposite side portions of said elongated channel extending away from one another such that slidable insertion of said elongated slidable body into said elongated open passageway of said elongated channel forces penetration of the pair of electrical conductors of the electrical power-supply cord by said end portions of said pair of electrical contacts mounted to said intermediate portion of said elongated channel.

3. The apparatus of claim 1 wherein said elongated channel is defined centrally along and recessed into said outer housing body; and also wherein said cap member comprises:

a main panel;

a pair of relatively-slidable and releasable-interfitting flange connections defined along a pair of opposite sides of said main panel and opposite portions of said outer housing body; and an elongated protruding panel portion defined centrally along and on said main panel such that interfitting said main panel onto said outer housing body, to complete said interfitting flange connections between said main panel and said outer housing body, inserts said elongated protruding panel portion into said elongated open passageway of said elongated channel forcing penetration of the pair of electrical conductors of the electrical power-supply cord by said end portions of said pair of electrical contacts mounted to said intermediate portion of said elongated channel.

4. The apparatus of claim 1 wherein said elongated channel is defined centrally along and recessed into said outer housing body; and also wherein said cap member comprises:

a main panel;

a pair of relatively-movable and detachably-interfitting latch connections defined centrally on a pair of opposite sides of said main panel and on opposite portions of said outer housing body; and an elongated protruding panel portion defined centrally along and on said main panel such that interfitting of said main panel onto said outer housing body, to complete said interfitting latch connections between said main panel and said outer housing body, inserts said elongated protruding panel portion into said elongated open passageway of said elongated channel forcing penetration of the pair of electrical conductors of the electrical power-supply cord by said end portions of said pair of electrical contacts mounted to said intermediate portion of said elongated channel.

5. The apparatus of claim 1 wherein said elongated channel is defined along and recessed into said outer housing body; and also wherein said cap member comprises:

a main panel pivotally mounted along a first of a pair of opposite edge portions thereof to said outer housing body;

a pair of detachable screw connections defined on a second of said pair of opposite edge portions of said main panel and on said outer housing body; and an elongated protruding panel portion defined adjacent to said second of said pair of opposite edge portions of said main panel such that attaching of said main panel onto said outer housing body, to complete said screw connections between said main panel and said outer housing body, inserts said elongated protruding panel portion into said elongated open passageway of said elongated channel forcing penetration of the pair of electrical conductors of the electrical power-supply cord by said end portions of said pair of electrical contacts mounted to said intermediate portion of said elongated channel.

6. The apparatus of claim 1 wherein said elongated channel is defined along and recessed into said outer housing body; and also wherein said cap member comprises:

a main panel;

pairs of detachable screw connections defined on a pair of opposite edge portions of said main panel and on said outer housing body; and an elongated protruding panel portion defined adjacent to one of said pair of opposite edge portions of said main panel such that attaching of said main panel onto said outer housing body, to complete said screw connections between said main panel and said outer housing body, inserts said elongated protruding panel portion into said elongated open passageway of said elongated channel forcing penetration of the pair of electrical conductors of the electrical power-supply cord by said end portions of said pair of electrical contacts mounted to said intermediate portion of said elongated channel.

7. The apparatus of claim 1 wherein said electrical port comprises a plurality of USB ports defined in and open exteriorly of a portion of said outer housing body and configured to receive and electrically couple with a plurality of USB cords electrically connected to a corresponding plurality of portable electrical devices.

8. The apparatus of claim 1 wherein said electrical port is defined in and open exteriorly of a portion of said outer housing body and configured to receive and electrically couple with and transfer drawn electrical current through an inductive charging pad coupled with the at least one portable electrical device.

9. The apparatus of claim 1 further comprising a support cradle formed on said outer housing body for holding in place a mobile electrical device.

10. An apparatus for charging at least one portable electrical device, said apparatus comprising:

an outer housing body comprising a pair of opposite end walls, a pair of opposite side walls, a top wall, and a bottom wall opposite said top wall, said walls interconnected so as to enclose an inner compartment;

an elongated channel having a pair of opposite ends open exteriorly of said housing body at said opposite end walls thereof, said elongated channel comprising a pair of side portions spaced apart from one another and extending from one of said top and bottom walls of said outer housing body and opening exteriorly of said outer housing body and also extending between and from adjacent to and opening exteriorly at said pair of opposite end walls of said housing body, and an intermediate portion extending between and interconnecting said pair of side portions and spaced and recessed from said opening of said side portions exteriorly of said outer housing body and at said opposite open ends of said elongated channel, said pair of side portions and said intermediate portion defining an elongated open passageway extending between said opposite open ends of said elongated channel for receiving through said elongated open passageway a pair of electrical conductors of a length of an electrical power-supply cord of a hosting electrical device;

a pair of electrical contacts mounted to said intermediate portion of said elongated channel and having end portions extending into said elongated open passageway of said elongated channel configured to penetrate and electrically couple with the pair of electrical conductors of the electrical power-supply cord when received through said elongated open passageway of said elongated channel so as to draw electrical current from the pair of electrical conductors of the electrical power-supply cord;

a cap member configured to insert into said elongated open passageway of said elongated channel so as to force penetration of the pair of electrical conductors of the electrical power-supply cord by said end portions of said pair of electrical contacts mounted to said intermediate portion of said elongated channel;

a universal serial bus (USB) port defined in one wall of opposite end walls and opposite side walls of said outer housing body, said USB port being open exteriorly of said outer housing body and configured to receive and electrically mate with a USB cord electrically connected to at least one portable electrical device; and a circuit board disposed in said interior compartment of said outer housing body and electrically coupled to said pair of electrical contacts and to said USB port to transfer the drawn electrical current to the at least one portable electrical device.

11. The apparatus of claim 10 wherein said cap member comprises:

an elongated slidable body that inserts into a portion of said elongated open passageway being spaced from said intermediate portion of said elongated channel; and a pair of ribs attached to and extending in opposite directions from opposite lateral sides of said elongated slidable body so as to slide along a pair of elongated slots in said opposite side portions of said elongated channel extending away from one another such that slidable insertion of said elongated slidable body into said elongated open passageway of said elongated channel forces penetration of the pair of electrical conductors of the electrical power-supply cord by said end portions of said pair of electrical contacts mounted to said intermediate portion of said elongated channel.

12. The apparatus of claim 10 wherein said elongated channel is defined centrally along and recessed into one of a bottom or top of said outer housing body; and said cap member comprises:

a main panel;

a pair of relatively-slidable and releasably-interfitting flange connections defined along a pair of opposite sides of said main panel and a pair of opposite corner edges of one of said bottom or top of said outer housing body; and an elongated protruding panel portion defined centrally along and on said main panel such that interfitting of said main panel onto said outer housing body, to complete said interfitting flange connections between said main panel and said outer housing body, inserts said elongated protruding panel portion into said elongated open passageway of said elongated channel forcing penetration of the pair of electrical conductors of the electrical power-supply cord by said end portions of said pair of electrical contacts mounted to said intermediate portion of said elongated channel.

13. The apparatus of claim 10 wherein said elongated channel is defined centrally along and recessed into one of a top and bottom of said outer housing body; and said cap member comprises:

a main panel;

a pair of relatively-movable and detachably-interfitting latch connections defined centrally along a pair of opposite sides of said main panel and one of a pair of top and a pair of bottom corners of said outer housing body; and an elongated protruding panel portion defined centrally along and on said main panel such that interfitting of said main panel onto said outer housing body, to complete said interfitting latch connections between said main panel and said outer housing body, inserts said elongated protruding panel portion into said elongated open passageway of said elongated channel forcing penetration of the pair of electrical conductors of the electrical power-supply cord by said end portions of said pair of electrical contacts mounted to said intermediate portion of said elongated channel.

14. The apparatus of claim 10 wherein said elongated channel is defined along and recessed into said outer housing body adjacent to one of a pair of corners on one of a pair of opposite edges of one of a top and bottom of said outer housing body; and also wherein said cap member comprises:

a main panel pivotally mounted along a first of a pair of opposite edge portions thereof to said outer housing body adjacent to another pair of corners on the other of said pair of opposite edges of one of said top and bottom thereof;

a pair of detachable screw connections defined adjacent a pair of corners on a second of said pair of opposite edge portions of said main panel and on a pair of corners of said outer housing body; and an elongated protruding panel portion defined adjacent to said second of said pair of opposite edge portions of said main panel such that attaching of said main panel onto said outer housing body, to complete said screw connections between said main panel and said outer housing body, inserts said elongated protruding panel portion into said elongated open passageway of said elongated channel forcing penetration of the pair of electrical conductors of the electrical power-supply cord by said end portions of said pair of electrical contacts mounted to said intermediate portion of said elongated channel.

15. The apparatus of claim 10 wherein said elongated channel is defined along and recessed into said outer housing body adjacent to one of a pair of opposite edges of one of a top and bottom of said outer housing body; and also wherein said cap member comprises:

a main panel;

pairs of detachable screw connections defined at pairs of corners on each of a pair of opposite edge portions of said main panel and on a pair of corners of said outer housing body; and an elongated protruding panel portion defined adjacent to one of said pair of opposite edge portions of said main panel such that attaching of said main panel onto said outer housing body, to complete said screw connections between said main panel and said outer housing body, inserts said elongated protruding panel portion into said elongated open passageway of said elongated channel forcing penetration of the pair of electrical conductors of the electrical power-supply cord by said end portions of said pair of electrical contacts mounted to said intermediate portion of said elongated channel.

16. The apparatus of claim 10 wherein said USB port comprises a plurality of USB ports defined in and open exteriorly of one of said side walls of said outer housing body and configured to receive and electrically couple with a plurality of USB cords electrically connected to a corresponding plurality of portable electrical devices.

17. The apparatus of claim 16 wherein the USB port is defined in and open exteriorly of one of said side walls of said outer housing body and configured to receive and electrically couple with and transfer electrical current through an inductive charging pad coupled with the at least one portable electrical device.

18. The apparatus of claim 10 wherein said outer housing body has a support cradle formed therein for holding in place a mobile electrical device.

19. A method for charging at least one portable electrical mobile device, said method comprising:

obtaining a charging apparatus having an elongated channel with a passageway on an outer housing body of the charging apparatus being open exteriorly on the outer housing body, a pair of conductor-penetrating electrical contacts in the passageway, an electrical port on the outer housing body being open exteriorly on the outer housing body, and a circuit board interconnecting the electrical contacts and the electrical port;

placing a pair of electrical conductors of a length of an electrical power-supply cord of a hosting electrical device within the passageway of the elongated channel; and applying a cap member upon the electrical conductors of the electrical power-supply cord so as to force penetration of the electrical conductors by the electrical contacts so as to thereby electrically couple the electrical contacts to the electrical conductors such that electrical current is drawn from the electrical power-supply cord to the electrical port and therefrom to a portable electrical device plugged into the electrical port of the charging apparatus.

20. The method of claim 19 further comprising:

securing the cap member to the outer housing body of the charging apparatus.

* * * * *